United States Patent
Yanagida et al.

(10) Patent No.: US 11,661,033 B2
(45) Date of Patent: *May 30, 2023

(54) RELAY DEVICE, STORAGE MEDIUM STORING PROGRAM FOR RELAY DEVICE, AND CONTROL METHOD OF RELAY DEVICE

(71) Applicant: TOYOTA JIDOSHA KABUSHIKI KAISHA, Toyota (JP)

(72) Inventors: Tohru Yanagida, Nagoya (JP); Chikage Kubo, Chofu (JP); Ai Fujimura, Toyota (JP); Shunsuke Noda, Kakamigahara (JP); Satoshi Usui, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 256 days.

This patent is subject to a terminal disclaimer.

(21) Appl. No.: 17/154,413

(22) Filed: Jan. 21, 2021

(65) Prior Publication Data

US 2021/0139003 A1    May 13, 2021

Related U.S. Application Data

(63) Continuation of application No. 16/202,644, filed on Nov. 28, 2018, now Pat. No. 10,946,834.

(30) Foreign Application Priority Data

Nov. 29, 2017    (JP) .............................. JP2017-229183

(51) Int. Cl.
*B60R 25/24*    (2013.01)
*G06Q 50/28*    (2012.01)
(Continued)

(52) U.S. Cl.
CPC ..... *B60R 25/241* (2013.01); *G06Q 10/06314* (2013.01); *G06Q 50/28* (2013.01)

(58) Field of Classification Search
CPC . B60R 25/241; G06Q 10/06314; G06Q 50/28
(Continued)

(56) References Cited

U.S. PATENT DOCUMENTS 8,841,987 B1 * 9/2014 Stanfield ............... B60R 25/241
340/5.61
10,210,689 B1    2/2019 Cermak et al.
(Continued)

FOREIGN PATENT DOCUMENTS

CN    104854603    8/2015
CN    105083216    11/2015
(Continued)

*Primary Examiner* — Krishnan Ramesh
(74) *Attorney, Agent, or Firm* — Oblon, McClelland, Maier & Neustadt, L.L.P.

(57) ABSTRACT

In a system that enables a person who possesses a portable device in which enablement data as data that permits operation of a vehicle is stored, to operate the vehicle, a relay device is provided for relaying the enablement data from a center server that issues the enablement data of the vehicle, to a portable device of a person scheduled to operate the vehicle. The relay device includes an obtaining unit that obtains the enablement data of the vehicle from the center server, a temporarily storing unit that temporarily stores the enablement data obtained by the obtaining unit, in a storage device, and a transmitting unit that sends the enablement data stored in the storage device, to a portable device used by a person in charge of operation of the vehicle.

18 Claims, 8 Drawing Sheets

(51) Int. Cl.
  *G06Q 10/06* (2023.01)
  *G06Q 10/0631* (2023.01)
(58) Field of Classification Search
  USPC .............................................................. 701/2
  See application file for complete search history.

(56) References Cited

U.S. PATENT DOCUMENTS

| | | | | |
|---|---|---|---|---|
| 2013/0237174 A1* | 9/2013 | Gusikhin | ................ | H04W 4/90 |
| | | | | 455/404.1 |
| 2014/0169564 A1* | 6/2014 | Gautama | ............ | G07C 9/00309 |
| | | | | 380/270 |
| 2015/0332531 A1* | 11/2015 | Davidsson | .......... | E05B 47/0001 |
| | | | | 70/256 |
| 2016/0048797 A1* | 2/2016 | Davidsson | ............. | G08G 1/144 |
| | | | | 705/332 |
| 2016/0098870 A1* | 4/2016 | Bergerhoff | .............. | H04W 4/48 |
| | | | | 340/5.61 |
| 2016/0189098 A1* | 6/2016 | Beaurepaire | ........ | H04W 12/084 |
| | | | | 705/337 |
| 2016/0210590 A1* | 7/2016 | Sugioka | ............. | G01C 21/3415 |
| 2017/0017920 A1* | 1/2017 | Stark | ................ | G06K 19/06037 |
| 2017/0132533 A1* | 5/2017 | Darnell | .................... | H04W 4/40 |
| 2017/0253216 A1* | 9/2017 | Nishidai | ........... | H04M 1/72412 |
| 2018/0056939 A1* | 3/2018 | van Roermund | ....... | B60R 25/04 |
| 2019/0001926 A1* | 1/2019 | Arakawa | ................ | B60R 25/241 |
| 2019/0092280 A1* | 3/2019 | Oesterling | ............ | H04W 12/04 |
| 2019/0147679 A1* | 5/2019 | Suzuki | ............... | G07C 9/00309 |
| | | | | 340/5.72 |
| 2019/0351869 A1* | 11/2019 | Eberlein | ............... | B60R 25/102 |
| 2019/0392663 A1* | 12/2019 | Miller | ................ | G07C 9/00174 |
| 2020/0086828 A1* | 3/2020 | Ujkashevic | ............. | B60R 25/24 |

FOREIGN PATENT DOCUMENTS

| | | |
|---|---|---|
| JP | 2002-175588 A | 6/2002 |
| JP | 2006-206225 | 8/2006 |
| JP | 2006-209429 | 8/2006 |
| JP | 2012-113696 A | 6/2012 |
| WO | WO 2013/076760 A1 | 5/2013 |

* cited by examiner

FIG. 3

| REQUESTING USER ID | COLLECTION/ DELIVERY | COLLECTION/ DELIVERY DATE AND TIME | COLLECTION/ DELIVERY LOCATION | COLLECTING/ DELIVERING USER ID | COLLECTION/ DELIVERY STATUS |
|---|---|---|---|---|---|
| I001 | DELIVERY | 2017/11/1 | VEHICLE | S005 | COMPLETED |
| I002 | COLLECTION | 2017/11/2 | VEHICLE | S003 | UNCOMPLETED |
| I003 | DELIVERY | 2017/11/3 | VEHICLE | NOT DETERMINED | UNCOMPLETED |

FIG. 4

| REQUESTING USER ID | VEHICLE TYPE | COLOR | PLATE NUMBER | VEHICLE LOCATION |
|---|---|---|---|---|
| I001 | ... | WHITE | XXYY | ... |

FIG. 5

| USER ID | PASSWORD | VEHICLE TYPE | COLOR | PLATE NUMBER | SERIAL NUMBER | KEY UNIT INFORMATION | AUTHENTICATION INFORMATION |
|---|---|---|---|---|---|---|---|
| I001 | AABBCC | ... | WHITE | XXYY | ... | ... | ... |

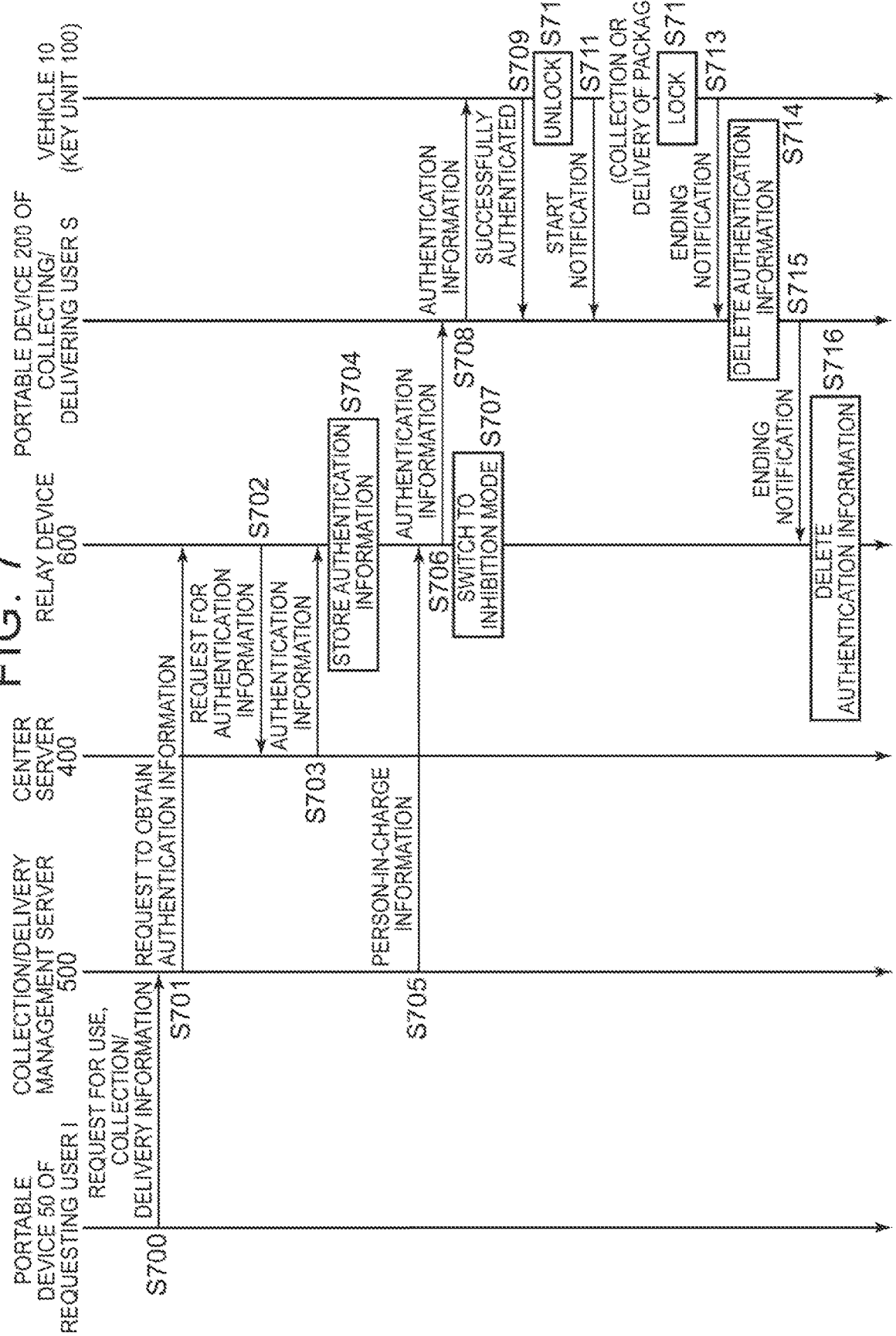

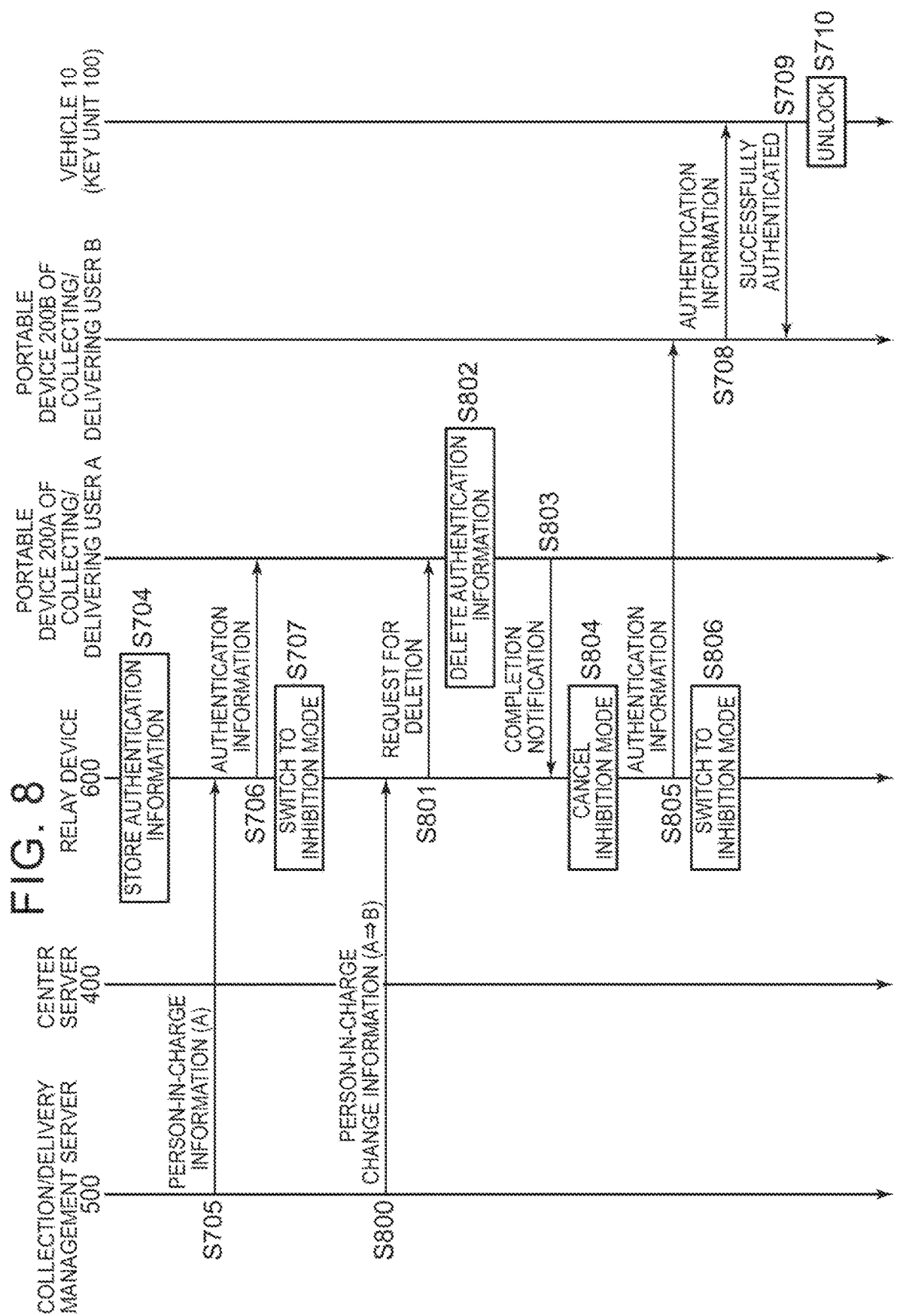

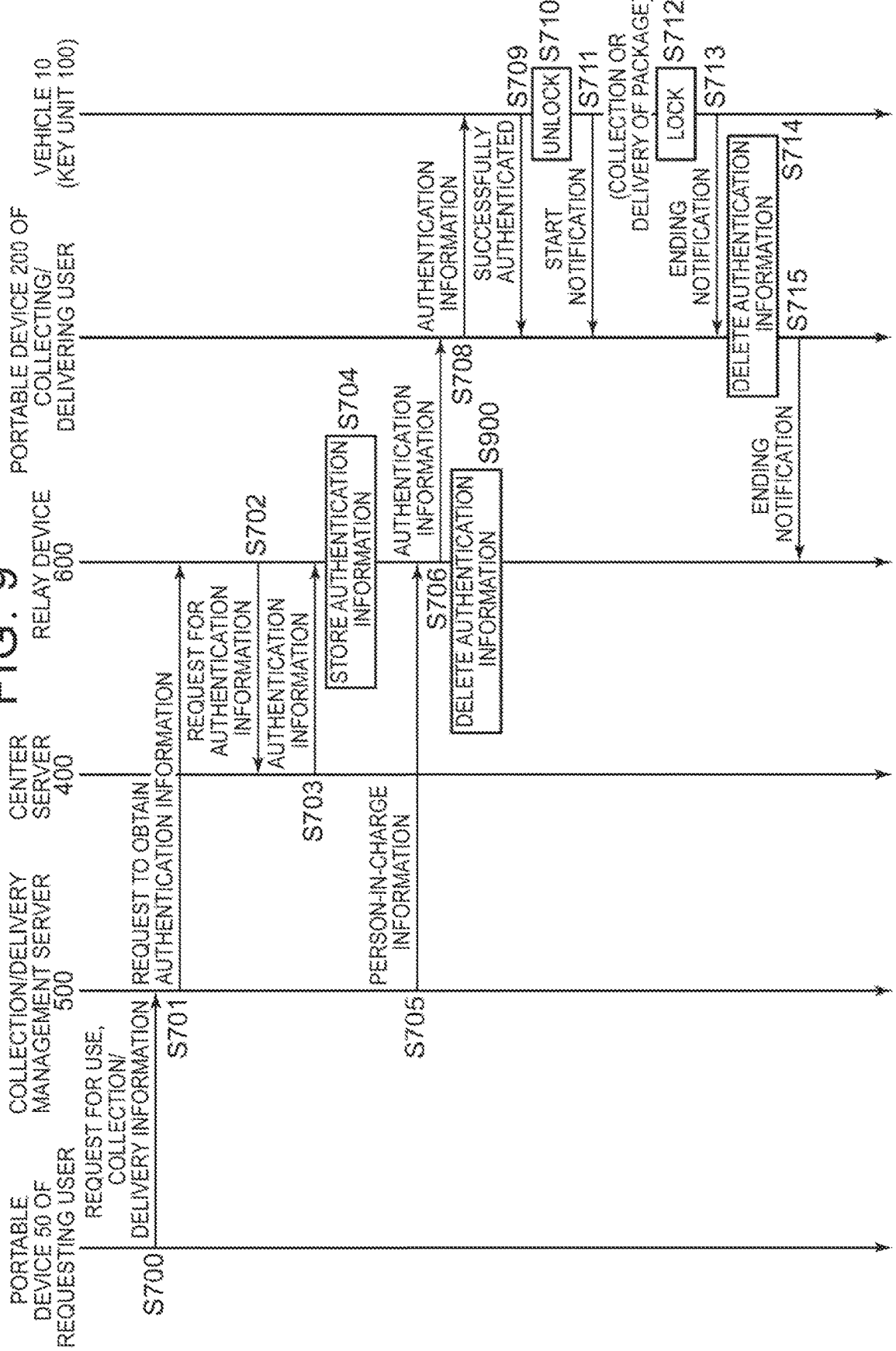

RELAY DEVICE, STORAGE MEDIUM STORING PROGRAM FOR RELAY DEVICE, AND CONTROL METHOD OF RELAY DEVICE

CROSS-REFERENCE TO RELATED APPLICATIONS

This application is a continuation of U.S. patent application Ser. No. 16/202,644, filed on Nov. 28, 2018, which claims priority to Japanese Patent Application No. 2017-229183 filed on Nov. 29, 2017, which are incorporated herein by reference in its entirety.

BACKGROUND

1. Technical Field

The disclosure relates to a relay device for operating a vehicle by use of a portable device, a storage medium storing a program for the relay device, and a control method of the relay device.

2. Description of Related Art

A technology for enabling operation (e.g., locking/unlocking, turn-on of a power supply, and engine starting) of a vehicle, using a portable device, such as a smartphone, in place of a vehicle key, has been studied. With this technology utilized, the vehicle can be easily permitted to be temporarily operated by a person (namely, a person who does not possess a physical vehicle key) other than the owner of the vehicle; therefore, a new method of using a vehicle or new service utilizing a vehicle has been expected to appear. For example, a system described in Japanese Patent Application Publication No. 2006-206225 (JP 2006-206225 A) permits a delivery service person to unlock a vehicle of a receiver or addressee and place a parcel or package in a trunk room, if a device on the delivery side and a device on the receiver's vehicle side are successfully authenticated by each other.

SUMMARY

A system devised by the inventors of this disclosure provides a person who wishes to operate a vehicle with data (which will be called "enablement data") for enabling the person to operate the vehicle, and permits a person having a portable device in which the enablement data is stored, to temporarily operate the vehicle. In implementation of this system, it is desired to take sufficient security measures in handling of the enablement data, so as to prevent improper use or theft of the vehicle caused by leakage of the enablement data. For example, it is desirable that the enablement data of each vehicle is issued solely by a center server. Also, when the enablement data is provided to a portable device, it is desirable to check if the person who wishes to operate the vehicle can be trusted, and provide the enablement data only to a portable device of the person who can be trusted. Also, in some cases, operation (exclusion operation) to guarantee the uniqueness of enablement data is desired, so as to prevent the power to operate the vehicle from being given to two or more persons at the same time.

However, it is not realistic that all of the above operations are performed solely by the center server, since the load of the system and the load of the network may be locally concentrated.

Also, depending on the scene to which this system is applied, it may not be determined who will actually use the enablement data (namely, a portable device to which the enablement data is to be transmitted), at the time when the center server issues the enablement data. Where delivery service as described in JP 2006-206225 A is taken as an example, even if it is determined in advance that enablement data of a vehicle A needs to be transmitted to a delivery company X on Nov. 9, 2017, it may not be determined until immediately before the delivery time, who will be in charge of the delivery to the vehicle A, out of two or more delivery persons belonging to the delivery company X. Nonetheless, it is not desirable to send the enablement data to all of the delivery persons, or permit the delivery persons to freely give and receive the enablement data to and from each other, because risks of leakage and improper use of the enablement data may be increased.

The present disclosure provides a technology for safely and efficiently sending data for enabling operation of a vehicle, to a person who is scheduled to use the data.

According to one aspect of the disclosure, a relay device configured to temporarily store enablement data obtained in advance from a center server, and send the enablement data to a portable device of a person in charge of operation of a vehicle after the person in charge is determined is provided.

More specifically, a relay device for use in a system that enables a person who possesses a portable device in which enablement data as data that permits operation of a vehicle is stored, to operate the vehicle, is provided. The relay device is adapted to relay the enablement data from a center server that issues the enablement data of the vehicle, to a portable device of a person who is scheduled to operate the vehicle. The relay device includes an obtaining unit, a temporarily storing unit, and a transmitting unit. The obtaining unit is configured to obtain the enablement data of the vehicle from the center server. The temporarily storing unit is configured to temporarily store the enablement data obtained by the obtaining unit, in a storage device. The transmitting unit is configured to send the enablement data stored in the storage device, to a portable device used by a person in charge of operation of the vehicle.

If the center server attempts to perform all of operations or tasks, such as management of user information, receipt of a request from each user, check of the validity of the user and his/her portable device, transmission of enablement data to the portable device of each user, and exclusion control of the enablement data, the processing load of the center server and the load of the network increase with increase in the number of users, and the operation of the system is expected to be extremely difficult, while the operation cost is expected to be huge. On the other hand, when the relay device as described above is used, the center server is only required to perform secure operation with the relay device, and therefore, the load of the center server can be significantly reduced, as compared with the case where secure operation is performed between the center server and all of the users. Also, since the relay device sends enablement data to a person in charge, it is guaranteed that the enablement data is transmitted only to the person scheduled to actually use the enablement data, and a risk, such as leakage of enablement data, can be reduced.

In this connection, the above-mentioned "enablement data" may be data (or program) that can be implemented by a computer, or may be data that cannot be implemented by a computer. The "enablement data" may also be data for proving that the person who possesses the portable device is a person who is permitted to operate the vehicle, data for activating a device or a program used for the operation of the vehicle, or a program itself used for the operation of the vehicle, or may be other data. The "portable device" may be any device, provided that the person who operates the vehicle can carry the device, and the device is able to receive and store the enablement data. For example, a portable device, such as a smartphone, tablet computer, mobile computer, wearable computer, wireless storage, mobile phone, and handy terminal, may be used as the "portable device" of the disclosure.

In the relay device as described above, the obtaining unit may be configured to obtain the enablement data of the vehicle from the center server, when the vehicle is scheduled to be operated, but it has not been determined who is in charge of the operation of the vehicle. The transmitting unit may be configured to send the enablement data stored in the storage device, to the portable device used by the person in charge of the operation of the vehicle, after the person in charge of the operation of the vehicle is determined. The relay device thus configured can obtain and store the enablement data before the person in charge is determined. Thus, as soon as the person in charge is determined, the enablement data can be promptly provided to the person in charge. Also, the degree of freedom in scheduling of the execution time of the enablement data obtaining process by the relay device is increased; therefore, when the load of the CPU or network is relatively low, such as at night, a plurality of pieces of enablement data can be obtained from the center server at a time, for example. This arrangement is advantageous in load distribution and efficient operation of the relay device and the center server.

In the relay device as described above, the obtaining unit may be configured to send a request including at least information indicating a scheduled date and time at which the vehicle is scheduled to be operated, to the center server, so as to be supplied with the enablement data corresponding to the request, from the center server. By giving information indicating the scheduled date and time to operate the vehicle, to the center server, it is possible for the center server to set a valid period for the enablement data, and adjust the timing of supply of the enablement data in accordance with the scheduled date and time, for example.

The relay device as described above may further include a person-in-charge information receiving unit configured to receive person-in-charge information for identifying the person in charge of the operation of the vehicle. When the person-in-charge information receiving unit receives the person-in-charge information, the transmitting unit may be configured to send the enablement data to the portable device used by the person identified by the person-in-charge information. With the relay device thus configured, since transmission of the enablement data is performed using receipt of the person-in-charge information as a trigger, the enablement data can be automatically transmitted at an appropriate time to the portable device used by the person in charge. The person-in-charge information receiving device may accept information manually entered by someone into the relay device, or obtain the person-in-charge information from another computer, or read the person-in-charge information from a storage medium.

The relay device as described above may further include a deleting unit configured to delete the enablement data stored in the storage device, after transmission of the enablement data to the portable device used by the person in charge is completed. With the relay device thus configured, the enablement data is deleted at the time as described above, so that the enablement data can be prevented from being transmitted to two or more portable devices, and the uniqueness of the enablement data can be guaranteed. Also, the period for which the enablement data is temporarily stored in the storage device can be minimized, so that the risk of leakage of the enablement data can be reduced to a minimum.

In the relay device as described above, the deleting unit may be configured to delete the enablement data stored in the storage device, after transmission of the enablement data to the portable device used by the person in charge is completed and the operation of the vehicle by the person in charge is confirmed. Even when transmission of the enablement data to the portable device is completed, the person in charge may lose the enablement data by mistake, or the person in charge may be changed to another person. In such cases, there arises a need to transmit the enablement data from the relay device again. With the relay device configured as described above, the enablement data remains in the storage device at least until the operation of the vehicle by the person in charge is confirmed, thus making it possible to easily deal with re-transmission of the enablement data as described above.

The relay device may further include a notification receiving unit configured to receive a notification indicating that the person in charge has started the operation of the vehicle or the person in charge has finished the operation of the vehicle, from the portable device used by the person in charge. The deleting device may be configured to delete the enablement data stored in the storage device in response to receipt of the notification by the notification receiving unit. With the relay device thus configured, the relay device can easily and automatically detect the operation of the vehicle by the person in charge.

The relay device as described above may further include an inhibiting unit configured to inhibit the enablement data remaining in the storage device from being transmitted to another portable device, until the enablement data is deleted by the deleting unit after transmission of the enablement data to the portable device used by the person in charge is completed. With the relay device thus configured, the enablement data can be prevented from being transmitted to two or more portable devices.

In the relay device as described above, when the person in charge of the operation of the vehicle is changed from a first person in charge to a second person in charge, after transmission of the enablement data to the portable device used by the first person in charge is completed, (i) the inhibiting unit may be configured to cancel an inhibition mode in which transmission of the enablement data is inhibited, and (ii) the transmitting unit may be configured to send the enablement data to a portable device used by the second person in charge. With the relay device thus configured, when the person in charge is changed, the enablement data can be promptly transmitted to the portable device of the person in charge after the change.

The relay device as described above may further include a person-in-charge changing unit configured to perform a process of changing the person in charge of the operation of the vehicle. When the person in charge of the operation of the vehicle is changed from a first person in charge to a second person in charge, after transmission of the enablement data to the portable device used by the first person in charge is completed, (i) the person-in-charge changing unit may be configured to perform deleting operation to delete the enablement data stored in the portable device used by the first person in charge, and (ii) the transmitting unit may be configured to send the enablement data to a portable device used by the second person in charge, after the deleting operation performed by the person-in-charge changing device is completed. With the relay device thus configured, the enablement data is not transmitted to the portable device of the person in charge after the change, until after the enablement data is deleted from the portable device of the person in charge before the change. Thus, the uniqueness of the enablement data can be guaranteed.

In the relay device as described above, (i) the vehicle may include a vehicle-mounted unit used for the operation of the vehicle, (ii) the enablement data may be authentication information used by the vehicle-mounted unit for authentication of the portable device, and (iii) the vehicle may be permitted to be operated using the vehicle-mounted unit, when the portable device is successfully authenticated by the enablement data stored in the portable device.

In the relay device as described above, the vehicle-mounted unit may be configured to perform authentication of the portable device via short-range wireless communication. When the system is configured such that the vehicle-mounted unit and the portable device communicate with each other via a mobile telephone network or the Internet, the portable device cannot be authenticated at a location where radio waves of mobile phones or Wi-Fi cannot reach, and the vehicle cannot be operated. Also, if a communication contract of the mobile telephone network or the Internet is needed for the vehicle-mounted unit, it may become a barrier to prevalence or widespread use of the vehicle-mounted unit. On the other hand, where the relay device is configured as described above, the vehicle-mounted unit and the portable device can directly communicate with each other via short-range wireless communications, and the above problems do not occur, thus assuring excellent convenience.

In the relay device as described above, the vehicle-mounted unit may be configured to behave in the same manner as a smart key of the vehicle, when the portable device is successfully authenticated. If the vehicle is compatible with a smart key, the vehicle-mounted unit can be installed on the vehicle, without requiring special modification. With the relay device thus configured, the vehicle-mounted unit can be easily introduced into a vehicle selected from a wide choice of vehicles, which leads to an advantage that the system is more likely to prevail.

According to another aspect of the disclosure, a relay device or system having at least a part of the configuration of the relay device as described above can be provided. According to a further aspect of the disclosure, a control method of a relay device or a method of providing enablement data, including at least a part of the above processing, can be provided. According to a still another aspect of the disclosure, a program that causes a computer to function as a relay device, or a program that causes a computer to execute a control method of a relay device or a method of providing enablement data, or a computer-readable storage medium in which such a program is non-transitory stored, can be provided. The above configurations and operations may be combined as long as the combination does not give rise to technical inconsistency, to constitute the disclosure.

According to the aspects of the disclosure, it is possible to provide the technology for safely and efficiently sending data for enabling operation of a vehicle, to a person who is scheduled to use the data.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 shows one example of collection/delivery information of packages to be collected or delivered;

FIG. 4 shows one example of vehicle management information indicating the relationship between a requesting user, and a vehicle as a corresponding collection/delivery location;

FIG. 5 shows one example of information registered in a user information database (DB);

FIG. 7 is a view showing operation of a system of a first embodiment;

FIG. 8 is a view showing operation of a system of a second embodiment; and

FIG. 9 is a view showing operation of a system of a third embodiment.

DETAILED DESCRIPTION OF EMBODIMENTS

One example in which the technology according to the disclosure is applied to a trunk share system will be described.

Figure 1:
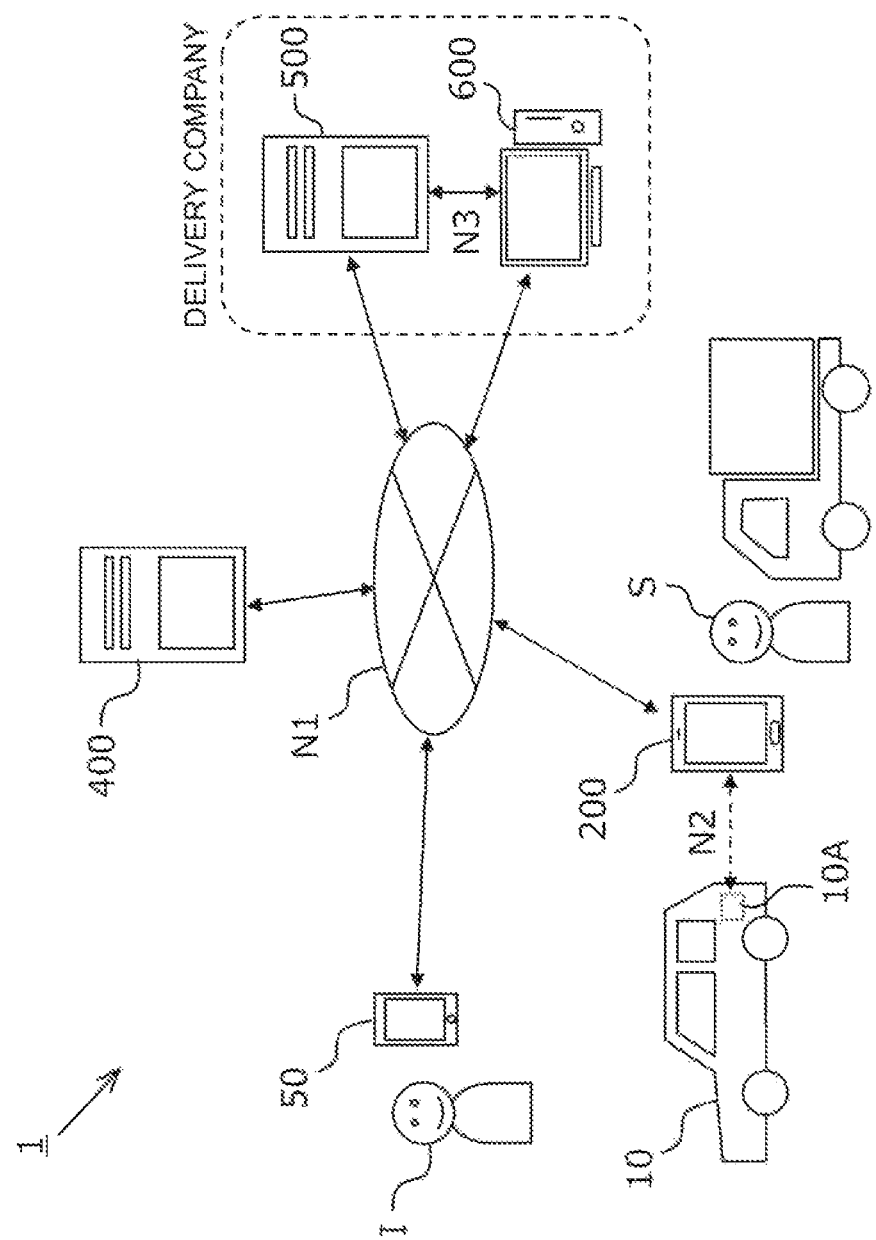
FIG. 1 is a view showing the general configuration of a trunk share system.

Initially, a first embodiment of the disclosure will be described. FIG. 1 schematically shows the configuration of a trunk share system 1 according to this embodiment. The trunk share system 1 permits a person 1 who requests collection or delivery work to collect or deliver an object, such as a package, and a person S who does the collection or delivery work, to share a trunk room of a vehicle 10 designated by the requesting person 1, so as to establish collection and delivery service using the trunk room as a pickup/delivery location. Thus, the "person 1 who requests collection or delivery work" and the "person S who does collection or delivery work" are both users who use the trunk room of the vehicle 10, but are distinguished from each other, by calling the former "requesting user 1", and calling the latter "collecting/delivering user S". A package or parcel to be collected or delivered can be placed in the trunk room of the vehicle 10, and a door of the trunk room is arranged to be locked and unlocked by a vehicle-mounted system 10A, as will be described later. The trunk room is preferably a region separated from a cabin boarded by a driver, etc. of the vehicle 10, such that the trunk room and the cabin are not accessible from each other.

In the example of FIG. 1, the trunk share system 1 includes the vehicle-mounted system 10A installed on the vehicle 10, a portable device 200 of the collecting/delivering user S, a portable device 50 of the requesting user 1, a center server 400, a collection/delivery management server 500, and a relay device 600. The vehicle-mounted system 10A, portable device 20, portable device 50, center server 4M, collection/delivery management server 500, and relay device 600 are connected to each other via a network N1. The network N1 may be a worldwide public telecommunication network, such as the Internet, for example, and a wide area network (WAN), and other communication networks may also be employed. The network N1 may also include a telephone communication network of mobile phones, and a wireless communication network, such as Wi-Fi. The vehicle-mounted system 10A can be connected to the portable device 200 of the collecting/delivering user S, via a network N2 including short-range wireless communications. While the trunk share system 1 includes only one relay device 600, by way of example, it may include two or more relay devices 600. For example, when a delivery company that performs collection and delivery work has two or more business offices, the relay device 600 that administers a plurality of collecting/delivering users may be installed for each business office, or for each business area. In the example of FIG. 1, the collection/delivery management server 500 and the relay device (00 are installed within a business office of a delivery company, and are connected by a local area network N3.

The collection/delivery management server 500 accepts registration of an article as an object of collection or delivery (which will also be referred to as "collection/delivery package"), from the portable device 50 of the requesting user 1. When the requesting user 1 asks the collecting/delivering user S to deliver an article which the user 1 purchased at a merchandise purchase site established by an electronic commerce company, as a collection/delivery package, for example, the user 1 can register collection/delivery information concerning the collection/delivery package in the collection/delivery management server 500, using an application installed on the portable device 50 of the requesting user 1 for using service provided by the trunk share system 1. The collection/delivery information include identification information on the requesting user I, collection/delivery schedule information, and so forth, as shown in FIG. 3 that will be described later. In the collection/delivery management server 500, the identification information of the requesting user 1 is associated in advance with the vehicle 10 linked with the requesting user 1, and the requesting user 1 selects a pickup/delivery location to be used, from candidates of pickup/deliver locations related with himself/herself (requesting user I) and including the vehicle 10. The pickup/delivery location thus selected is also included in the collection/delivery information. In the following description, the vehicle 10 is the pickup/delivery location selected by the requesting user 1.

When the collection/delivery management server 500 accepts a request for collection or delivery of a package from the portable device 50 of the requesting user 1, and the collection/delivery location is the vehicle 10, the server 500 requests the relay device 600 to obtain enablement data for enabling operation (locking and unlocking of the trunk room of the vehicle 10 in this embodiment) of the vehicle 10 in which the package is placed, from the center server 400. At this point in time, the date and time when the trunk room of the vehicle 10 is scheduled to be locked or unlocked is fixed, but who of two or more collecting/delivering users S is in charge of collection from or delivery to the trunk room of the vehicle 10 has not been determined. The person in charge of collection or delivery is determined when a certain number of requests for collection or delivery are accumulated, or at a predetermined point or points in time (e.g., once in the morning and once in the afternoon everyday), for example. More specifically, the collection/delivery management server 500 may automatically determine the person in charge, based on information (the number of packages, location, date and time) concerning collection and delivery and the work shift of each collecting/delivering user S. Alternatively, an administrator may determine the person in charge, based on information concerning collection and delivery, and the work shift of each collecting/delivering user S, and may enter the information on the person in charge, into the collection/delivery management server 500.

Once the person in charge is fixed, the collection/delivery management server 500 sends information on the person in charge, to the relay device 600.

The relay device 600 obtains enablement data of the vehicle 10 from the center server 400, and sends the enablement data to the portable device 200 used by the collecting/delivering user S who is in charge of collection from or delivery to the vehicle 10. The configuration and operation of the relay device 600 will be described later in detail. The collecting/delivering user S can unlock the trunk room of the vehicle 10, by using the portable device 200 in which the enablement data is stored, and access the trunk room of the vehicle 10 so as to collect or deliver the package. The enablement data of this embodiment is authentication information used by the vehicle-mounted system 10A (more specifically, a key unit 100 that will be described later) for authentication of the portable device 200, and is transferred from the portable device 200 to the vehicle-mounted system 10A via short-range wireless communications, for use in authentication operation performed by the vehicle-mounted system 10A.

Figure 2:
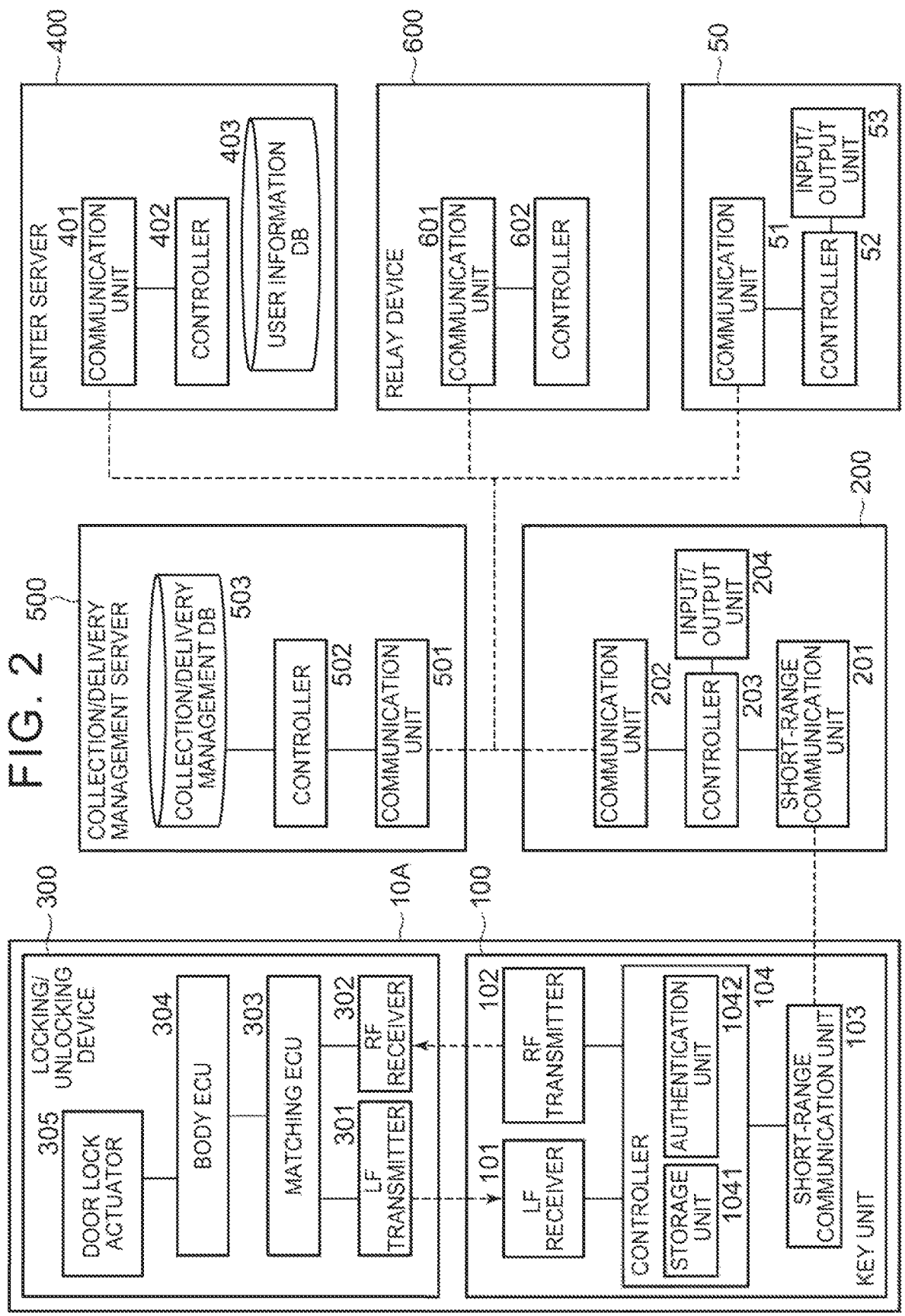
FIG. 2 is a block diagram of constituent elements of the trunk share system.

Next, the system configuration will be described. The block diagram of FIG. 2 schematically shows one example of the configuration of each of the vehicle-mounted system 10A, portable device 200 of the collecting/delivering user S, portable device 50 of the requesting user 1, collection/delivery management server 500, center server 40, and relay device 600, which constitute the trunk share system 1. Referring to FIG. 2, the hardware configuration and functional configuration of the vehicle-mounted system 10A, portable device 20 of the collecting/delivering user S, portable device 50 of the requesting user L collection/delivery management server 500, center server 400, and relay device 600 will be described.

The vehicle-mounted system 10A includes the key unit 10 and a locking/unlocking device 300. The locking/unlocking device 300 is incorporated in the vehicle 10, and is physically connected to a control system of the vehicle 10, whereas the key unit 100 is not connected to the control system of the vehicle 10 (for example, it is placed in a glove box or inside the vehicle). The locking/unlocking device 3M and the key unit 100 communicate with each other via radio waves. The key unit 100 has a wireless interface, like a so-called smart key, and communicates with the locking/unlocking device 300, so that it can lock and unlock the trunk room and cabin of the vehicle 10 (which may be simply stated as "lock and unlock the vehicle 10" when there is no need to distinguish the trunk room from the cabin), without using a physical key. The key unit 100 conducts short-range wireless communications with the portable device 200 of the collecting/delivering user S, and behaves similarly to a smart key, when the portable device 200 of the collecting/delivering user S is successfully authenticated.

When the collecting/delivering user S accesses the trunk room of the vehicle 10 for delivery or collection of a package to be delivered or collected, the portable device 200 of the user S receives authentication information for locking or unlocking the trunk room, via the relay device 600, and stores it in a memory. The authentication information of this embodiment is, for example, authentication information (more specifically, a public key) used for public key authentication. Then, the authentication information (public key) transmitted from the portable device 200 of the collecting/delivering user S to the key unit 100 is checked or matched against authentication information (a private key) stored in advance in the key unit 100. If the authentication operation is successful, the portable device 200 is authenticated as a terminal that can properly operate the vehicle-mounted system 10A. Once the portable device 200 is authenticated, the key unit 10 sends a key ID of the vehicle 10 stored in advance in the key unit 100 and associated with the authentication information, to the locking/unlocking device 300, along with a locking/unlocking signal. When the key ID received from the key unit 100 coincides with a key ID stored in advance in the locking/unlocking device 300, the locking/unlocking device 300 locks or unlocks the vehicle 10. The key ID stored in advance in the key unit 100 may be encrypted with the authentication information. In this case, when the authentication operation of the portable device 200 of the collecting/delivering user is successful, the key unit 10 may decrypt the key 1 with the authentication information, and then send it to the locking/unlocking device 30).

Here, details of the locking/unlocking device 300 will be described. The locking/unlocking device 300 is provided for locking and unlocking the door of the cabin or trunk room of the vehicle 10. For example, the locking/unlocking device 300 locks and unlocks the door of the vehicle 10, according to a locking signal and an unlocking signal transmitted via radio waves of a high-frequency (radio-frequency, which will be called "RF") zone, from a smart key corresponding to the vehicle 10. The locking/unlocking device 300 also has a function of sending radio waves of a low-frequency (which will be called "LF") zone, so as to search for the smart key. The locking/unlocking device 300 operates with electric power supplied from a battery installed on the vehicle 10.

In this embodiment, the key unit 100, instead of the smart key, sends and receives radio waves of the RF zone and LF zone to and from the locking/unlocking device 300, so as to control locking and unlocking of the door of the vehicle 10. In the following description, the destination of communications of the locking/unlocking device 300 is limited to the key unit 100, unless otherwise stated.

The locking/unlocking device 300 includes an LF transmitter 301. RF receiver 302, matching electronic control unit (ECU) 303, body electronic control unit (ECU) 304, and door lock actuator 305. The LF transmitter 301 is a device that transmits radio waves of a low-frequency zone (e.g., 100 KHz to 300 KHz) for searching for (polling) the key unit 100. The LF transmitter 301 is incorporated in the vicinity of the center console or steering wheel in the cabin, for example. The RF receiver 302 is a device that receives radio waves of a high-frequency zone (e.g., 100 MHz to 1 GHz) transmitted from the key unit 100. The RF receiver 302 is incorporated in any location within the cabin.

The matching ECU 303 is a computer that performs control to lock and unlock the door of the cabin or trunk room of the vehicle 10, based on a signal (locking signal or unlocking signal) transmitted from the key unit 100 via radio waves of the RF zone. The matching ECU 303 is provided by a microcomputer, for example. In the following description, the locking signal and the unlocking signal will be collectively called "locking/unlocking signal". The term "locking/unlocking signal" represents at least one of the locking signal and the unlocking signal.

The matching ECU 303 certifies that the locking/unlocking signal transmitted from the key unit 100 was transmitted from a valid device. More specifically, the matching ECU 303 determines whether a key ID included in the locking/unlocking signal coincides with a key ID stored in advance in a storage unit (not shown) of the matching ECU 303. Then, the matching ECU 303 sends an unlocking command or a locking command to the body ECU 304, based on the result of this determination. The unlocking command or locking command is transmitted via an in-vehicle network, such as a controller area network (CAN).

The door lock actuator 305 is an actuator that locks and unlocks the door of the vehicle 10 (e.g., a cabin door that is opened and closed when the driver or passenger gets on or off the cabin as boarding space, or a trunk room door that is opened and closed when a package is loaded into or unloaded from the trunk room), The door lock actuator 305 operates according to a signal transmitted from the body ECU 304. The door lock actuator 305 may also be configured to lock and unlock the cabin door and the trunk room door in the vehicle 10, independently of each other.

The body ECU 304 is a computer that controls the body of the vehicle 10. The body ECU 304 has a function of unlocking and locking the cabin door and trunk room door of the vehicle 10 at the same time or independently of each other, by controlling the door lock actuator 305 based on the unlocking command or locking command received from the matching ECU 303. The matching ECU 303 and the body ECU 304 may be integrated with each other.

Next, the key unit 1M will be described. The key unit 100 is placed at a given position (e.g., within the glove box) within the cabin of the vehicle 10. The key unit 100 may operate with electric power supplied from the battery installed on the vehicle 10 (e.g., may be supplied with power from a cigarette socket, alternating-current (AC) power supply, or a USB power supply, for example, included in the vehicle 10), or may operate with power supplied from an internal battery. The key unit 100 has a function of authenticating the portable device 200 of the collecting/delivering user S, by conducting short-range wireless communications with the portable device 200, etc. The key unit 100 also has a function of sending the locking/unlocking signal, using radio waves of the RF zone, based on the result of the authentication. The key unit 100 has an LF receiver 101. RF transmitter 102, short-range communication unit 103, and controller 104.

The LF receiver 101 is a device that receives a polling signal transmitted from the locking/unlocking device 300 via radio waves of the LF zone. The LF receiver 101 has an antenna (which will be called "LF antenna") for receiving the radio waves of the LF zone. The RF transmitter 102 is a device that sends the locking/unlocking signal to the locking/unlocking device 300, via radio waves of the RF zone.

The short-range communication unit 103 is a device that communicates with the portable device 20 of the collecting/delivering user S. The short-range communication unit 103 conducts communications in a short range or distance (to an extent that permits communications between the inside of the cabin and the outside of the cabin), using a certain wireless communication standard. In this embodiment, the short-range communication unit 103 performs data communications using the Bluetooth (registered trademark) low energy standard (which will be called "BLE"). The "BLE" is a low power communication standard using the Bluetooth, and is characterized in that one device can immediately start communicating with the other device upon detection of the other device, without requiring pairing of the two devices. While the BLE is indicated as an example in this embodiment, other wireless communication standards may also be used. For example, near field communication (NFC), ultra wide band (UWB), Wi-Fi (registered trademark), etc. may be used.

The controller 104 has a storage unit 1041 and an authentication unit 1042. The storage unit 1041 stores control programs for controlling the key unit 100. A central processing unit (CPU) (not shown) of the controller 104 executes the control programs stored in the storage unit 1041, so as to implement various functions including the authentication unit 1042. For example, the controller 104 has a function of receiving a polling signal in the form of radio waves of the LF zone transmitted from the locking/unlocking device 300, via the LF receiver 101, a function of sending a locking/unlocking signal in the form of radio waves of the RF zone to the locking/unlocking device 300, via the RF transmitter 102, a function of processing communications with the portable device 200 of the collecting/delivering user S conducted via the short-range communication unit 103, a function of producing a locking/unlocking signal when the portable device 200 of the collecting/delivering user S is successfully authenticated by the authentication unit 1042, and so forth.

The authentication unit 1042 authenticates the portable device 200 of the collecting/delivering user S, based on authentication information received from the portable device 200. More specifically, the authentication unit 1042 compares authentication information stored in the storage unit 1041, with authentication information transmitted from the portable device 200 of the collecting/delivering user, and determines that the portable device 200 is successfully authenticated when these pieces of information have a predetermined relationship. When the two pieces of authentication information do not satisfy the predetermined relationship, the authentication unit 1042 determines that the authentication failed. Here, the predetermined relationship includes the case where the authentication information stored in the storage unit 1041 coincides with the authentication information transmitted from the portable device 200 of the collecting/delivering user, and also includes the case where the processing results of given encryption, decryption, and the like, using the two pieces of authentication information coincide with each other, and the case where the result of decryption performed on one of the two pieces of authentication information coincides with the other information, for example.

When the authentication unit 1042 successfully authenticated the portable device 200 of the collecting/delivering user S, the locking/unlocking signal produced according to a request received from the portable device 200 is transmitted to the locking/unlocking device 300 via the RF transmitter 102.

The key unit 100 also transmits the above-mentioned key ID to the locking/unlocking device 30, along with the locking/unlocking signal. The key ID may be stored in advance in the form of plain text in the key unit 100, or may be stored in an encrypted form such that the key ID is encrypted with a code unique to the portable device 200 of the collecting/delivering user, for example. When the key ID is stored in the encrypted form, the original key ID may be obtained by decrypting the encrypted key 1D using the authentication information transmitted from the portable device 200 of the collecting/delivering user, for example.

Thus, the vehicle-mounted system 10A operates the locking/unlocking device 300 through the authentication operation by the key unit 100, using the authentication information transmitted from the portable device 200 as a starting point, so as to execute a series of steps for locking or unlocking the cabin or trunk room of the vehicle 10. The series of steps provide a locking/unlocking process performed by the vehicle-mounted system 10A. While the locking/unlocking process is indicated as an example in this embodiment, operation of the vehicle 10 permitted by the key unit 100 may also include turn-on of an ACC (accessory) power supply, engine starting, etc., as well as locking and unlocking.

Next, the portable device 2 of the collecting/delivering user S will be described. The portable device 200 is a small-sized computer, such as a smartphone, tablet computer, mobile computer, wearable computer, wireless storage, mobile phone, or handy terminal. The portable device 200 may also be a personal computer (PC) that is connected to the collection/delivery management server 500, via the network N1, such as the Internet as a public communication network. The portable device 200 of the collecting/delivering user S has a short-range communication unit 201, communication unit 202, controller 203, and input/output unit 204.

The short-range communication unit 201 is a device that communicates with the key unit 100, according to the same communication standard as that of the short-range communication unit 103 of the key unit 100. The network formed between the short-range communication unit 201 and the key unit 100 is denoted as "N2" in FIG. 1. The communication unit 202 is a communication device for connecting the portable device 200 to the network N1. In this embodiment, the communication unit 202 can communicate with other devices (including, for example, the center server 400, collection/delivery management server 500, relay device 60, etc.), via the network N1, using mobile communication service, such as 3rd Generation (3G), and long term evolution (LTE).

The controller 203 is a computer that governs control of the portable device 200. For example, the controller 203 performs various operations, such as operation to obtain terminal authentication information as described above, operation to produce a request for locking or unlocking including the obtained terminal authentication information, and operation to transmit the produced request for locking or unlocking, to the key unit 100. The controller 203 is provided by a microcomputer, for example, and a CPU (not shown) of the controller 203 executes programs stored in a storage device (such as a read-only memory (ROM)) (not shown), so as to implement functions for performing the above operations.

The controller 203 also interacts with the collecting/delivering user S via the input/output unit 204. The input/output unit 204 is a device that accepts input operation performed by the collecting/delivering user S, and presents information to the collecting/delivering user S. More specifically, the input/output unit 204 consists of a touch panel and its controller, and a liquid crystal display and its controller. In this embodiment, the touch panel and the liquid crystal display are provided by one touch panel display.

The controller 203 displays an operation screen on the input/output unit 204, and produces a request for locking or unlocking, according to operation performed by the collecting/delivering user S. For example, the controller 203 outputs an icon, or the like, for unlocking, an icon, or the like, for locking, etc. on a touch panel display, and produces a request for unlocking or a request for locking, based on operation performed by the collecting/delivering user S. The operation performed by the collecting/delivering user S is not limited to those entered via the touch panel display, but may be those entered via a hardware switch, or the like, for example.

The controller 203 performs operation to obtain authentication information issued by the center server 40, via the relay device 600. The authentication information is not the information (key ID) with which the locking/unlocking device 300 authenticates the key unit 100, but information (e.g., a public key corresponding to a private key unique to the key unit 100) with which the key unit 100 authenticates the portable device 200.

In this embodiment, the authentication information obtained by the portable device 200 may be a one-time key that is revoked or invalidated in response to locking of the trunk room door as a trigger, following completion of collection or delivery work by the collecting/delivering user S. For example, the authentication information transmitted from the relay device 600 is stored in a storage unit (not shown) of the portable device 200, at the time when the authentication information is received by the portable device 200, and then, the authentication information is deleted from the above-described storage unit, at the time when the portable device 200 receives a locking notification transmitted from the key unit 100 when the trunk room door is locked following completion of the collection/delivery work.

The time at which the authentication information stored in the storage device of the portable device 200 is deleted is not limited to that of the above example, but may be the time when a predetermined time has elapsed from a point in time at which the portable device 20 received the authentication information (or a point in time at which the relay device 600 sent the authentication information toward the portable device 200). The authentication information is not limited to the one-time key as described above, but may be a limited key that is valid only within a predetermined time zone.

Next, the portable device 50 of the requesting user 1 will be described. Like the portable device 20, the portable device 50 is in the form of a smartphone, tablet computer, mobile computer, wearable computer, wireless storage, mobile phone, or handy terminal. The portable device 50 of the requesting user 1 has a communication unit 51, controller 52, and input/output unit 53.

The communication unit 51 is a communication device that is functionally similar to the communication unit 202, and is used for connecting the portable device 50 to the network N1. The controller 52 is a computer that governs control of the portable device 50, The controller 52 is provided by a microcomputer, for example, and a CPU (not shown) of the controller 52 executes programs stored in a storage device (such as a ROM), so as to implement functions for performing various operations. For example, the controller 52 executes the above-mentioned given application, so as to make a collection request to collect a package, to the collection/delivery management server 50 of a certain delivery company, via the input/output unit 53. The input/output unit 53, which is functionally similar to the input/output unit 204, accepts input operation performed by the requesting user 1, and presents information to the requesting user 1.

Like the portable device 200, the portable device 50 of FIG. 2 may be configured to perform short-range communications with the key unit 10, though a constituent element corresponding to the short-range communication unit 201 is not apparently specified. For example, authentication information may be stored in advance in a memory of the portable device 50, and the portable device 50 may be configured to actuate the locking/unlocking device 300.

Next, the collection/delivery management server 500 will be described. The collection/delivery management server 500 is provided by a general computer. In the case where two or more delivery companies join the trunk share system 1, each delivery company preferably prepares for at least one collection/delivery management server as its own management server(s). The collection/delivery management server 500 in the form of a computer has a processor, such as a central processing unit (CPU), and a digital signal processor (DSP), a main storage unit (not shown), such as a random access memory (RAM), and a read-only memory (ROM), and an auxiliary storage unit (not shown), such as an erasable programmable ROM (EPROM), a hard disc drive (HDD), and a removable media. The removable media is a universal serial bus (USB) memory, or a disc recording medium, such as a compact disc (CD), and a digital versatile disc (DVD). The auxiliary storage unit stores an operating system (OS), various programs, various tables, etc., and the programs stored in the auxiliary storage unit are loaded into a work area of the main storage unit, and executed. Each constituent unit, or the like, is controlled through execution of the corresponding program, so as to implement a function matching a given purpose.

The collection/delivery management server 500 further has a communication unit 501. The communication unit 501 is connected to other devices, and conducts communications between the collection/delivery management server 50 and other devices (e.g., the center server 40, portable device 200, and relay device 600). The communication unit 501 is, for example, a local area network (LAN) interface board, or a wireless communication circuit for wireless communication. The LAN interface board or the wireless communication circuit is connected to the network N1, such as the Internet as a public communication network.

The collection/delivery management server 500 further has a collection/delivery management database (DB) 503 that stores the above-mentioned collection/delivery information. The collection/delivery information is stored in the auxiliary storage unit, to form the collection/delivery management DB 503, in which the requesting user 1 and the collection/delivery information are linked with each other. The collection/delivery management DB 503 is constructed by managing data stored in the auxiliary storage unit, according to a program of a database management system (DBMS) executed by the processor. The collection/delivery management DB 503 is, for example, a relational database.

Referring to FIG. 3, the structure of the collection/delivery information stored in the collection/delivery management DB 503 will be described. FIG. 3 shows an example of the table structure of the collection/delivery information, and the collection/delivery information table has each field of the requesting user 1D, collection or delivery selected, collection/delivery date and time, collection/delivery location, collecting/delivering user 1D, and collection/delivery status. In the requesting user 1D field, identification information for identifying the requesting user 1 is entered. In the collection/delivery selection field, information for determining whether a package in question is to be delivered or collected by the collecting/delivering user S is entered. In the collection/delivery date and time field, information representing the date and time at which the package is collected or delivered is entered. Regarding the time of collection or delivery, in particular, a particular time may be entered, or a particular time zone in which collection or delivery is requested may be entered. In the collecting/delivering user ID field, identification information for identifying the collecting/delivering user S in charge of collection/delivery work is entered. In the example of FIG. 3, persons in charge of the first and second collection/delivery works are determined, but a person in charge of the third collection/delivery work has not been determined. The person in charge of collection/delivery work corresponds to "person in charge of operation (e.g., locking/unlocking of the trunk room) of the vehicle" according to the disclosure. In the collection/delivery status field, information as to whether collection or delivery of the package by the collecting/delivering user S has been completed is entered. For example, when collection or delivery of the package is completed, "COMPLETED" is entered. When the collection or delivery has not been completed, "UNCOMPLETED" is entered.

The controller 502 of the collection/delivery management server 500 performs management control, such as registration of collection/delivery information into the collection/delivery management DB 503, and updating of the information. When the requesting user 1 requests collection or delivery of a package via his/her portable device 50, for example, the controller 502 links the collection/delivery date and time, collection/delivery location, etc., with the identification information of the requesting user I, to produce collection/delivery information corresponding to the requesting user 1, and stores the collection/delivery information in the collection/delivery management DB 503, When a person in charge of collection/delivery work is registered or changed after the collection/delivery information is produced, or when a notification of change of information of the collection/delivery date and time or collection/delivery location is received from the requesting user 1, the collection/delivery information stored in the collection/delivery management DB 503 is updated in accordance with the change. The controller 502 also communicates with the portable device 200 of the collecting/delivering user S via the communication unit 501, and updates information concerning the status of the package, which is included in the collection/delivery information. For example, the controller 502 receives status information (e.g., information representing completion of collection or delivery) which the collecting/delivering user S entered via the input/output unit 204, from the portable device 200, and updates the corresponding collection/delivery information.

The collection/delivery management DB 503 also stores vehicle management information that links the requesting user, with the vehicle 10 as the corresponding collection/delivery location. Referring to FIG. 4, the structure of the vehicle management information is described. FIG. 4 shows an example of the table structure of the vehicle management information, and the vehicle management information table has a requesting user 1D field, and a vehicle type field, color field, and number field in which vehicle identification information (vehicle type, color, and number of the vehicle) for identifying the vehicle 10 is entered. The vehicle identification information enables the collecting/delivering user S to find the vehicle 10, when the requesting user 1 selects the vehicle 10 as the collection/delivery location. The vehicle management information table further has a vehicle position field in which position information representing a position at which the vehicle 10 is located is entered. The identification information and position information of the vehicle 10 may be obtained when entered by the requesting user 1 via the portable device 50, or the identification information and position information of the vehicle 10 may be obtained from the center server 400.

Then, the controller 502 sends a collection/delivery command to the portable device 200 of the collecting/delivering user S in charge of collection/delivery work, so that the user S can collect the package from or deliver the package to the vehicle 10, based on the collection/delivery information and the vehicle management information. The controller 502 may send the collection/delivery command to the portable device 200 two or more times, rather than once. For example, on the day before the scheduled collection/delivery date, the controller 502 may send a set of collection/delivery commands concerning collection/delivery events of the next day, to the portable device 200 of the collecting/delivering user, and send the collection/delivery commands again on the date of collection/delivery. If there is any updating of the collection/delivery information when the collection/delivery commands are sent again, the controller 502 causes the commands to reflect the updated content of the collection/delivery information.

Any of the functional constituent elements of the collection/delivery management server 500, or a part of the processing thereof, may be implemented by another computer connected to the network N1. Also, a series of processes executed by the collection/delivery management server 500 may be executed by software, though they can also be executed by hardware.

Next, the center server 40 will be described. The center server 400 is also provided by a general computer, and has the same basic hard configuration as the collection/delivery management server 500, namely, has a processor (not shown), a main storage unit, and an auxiliary storage unit. Thus, the processor loads programs stored in the auxiliary storage unit into a work area of the main storage unit, and executes the programs. With the programs thus executed, each constituent unit, or the like, is controlled, so as to implement a function matching a given purpose. The center server 400 also has a communication unit 401 that is functionally equivalent to the communication unit 501 of the collection/delivery management server 500, and the communication unit 401 conducts communications between the center server 400 and other devices (e.g., the collection/delivery management server 500, relay device 600, etc.).

The center server 400 has a user information database (DB) 403 that stores various kinds of information, in its auxiliary storage unit. The database (DB) is constructed by managing data stored in the auxiliary storage unit, according to a program of a database management system executed by the processor. The user information DB 403 is, for example, a relational database.

The user information DB 403 is a database that governs information of registered users of service that permits the users to operate the vehicle 10 using the key unit 100. FIG. 5 shows one example of information registered in the user information DB 403. In the user information DB 403, there may be stored information (such as a user 1D, and a password) used for authentication when each user accesses the center server 400, information (such as a vehicle type, color, license plate number, and serial number) of the vehicle 10 owned by the user, information (such as identification information that specifies the key unit 100, and authentication information (encryption key) stored in the key unit 100) on the key unit 100 installed in the vehicle, authentication information (such as a public key) as enablement data, and so forth. As additional information of the authentication information, information, such as the valid period (including valid time zone) of the authentication information, and expiration of the authentication information, may be stored.

A controller 402 of the center server 400 performs control, such as registration of new users, change of user information, issuance (production) of authentication information, and transmission of the authentication information to the relay device 600 and the portable device 200. Preferably, the process of issuing authentication information is performed solely by the center server 400.

The registration of a new user into the center server 400 is performed in the manner as follows, for example. The new user accesses a user registration site provided by the center server 400, using a portable terminal or a personal computer. Then, if the user enters, on a new registration screen, personal information (e.g., name, address, telephone number, mail address, password, etc.) of the user himself/herself, information (e.g., vehicle type, color, license plate number, serial number, etc.) of the vehicle to be registered, information of the key unit installed on the vehicle to be registered, and so forth, a user 1D is issued. Once the new user and the vehicle (key unit) are registered, the center server 400 issues (produces) authentication information as enablement data, based on the information of the key unit, and registers it in the user information DB 403. Thereafter, the user can access the center server 400 using the user 1D and the password, and can use service, such as trunk share, that utilizes authentication information. It is desirable to register vehicle information, such as a vehicle type, color, and license plate number, because such information is useful when the collecting/delivering user visually finds the vehicle so as to collect or deliver a package; however, registration of such information is not essential. While the user is supposed to perform registration operation for himself or herself in this embodiment, user registration and issuance of authentication information may be performed at a dealer or factory, where the key unit is installed before delivery of the vehicle.

Next, the relay device 600 will be described. The relay device 600 is provided for relaying authentication information (enablement data) from the center server 400 to the portable device 200 of the collecting/delivering user S. The relay device 600 is also provided by a general computer, and has a processor, main storage unit, auxiliary storage unit, etc., which are not illustrated in the drawings. The relay device 600 has a communication unit 601, and the communication unit 601 is functionally equivalent to the communication unit 501 of the collection/delivery management server 500, and conducts communications between the relay device 600 and other devices (e.g., the center server 400, collection/delivery management server 500, portable device 200, etc.).

Figure 6:
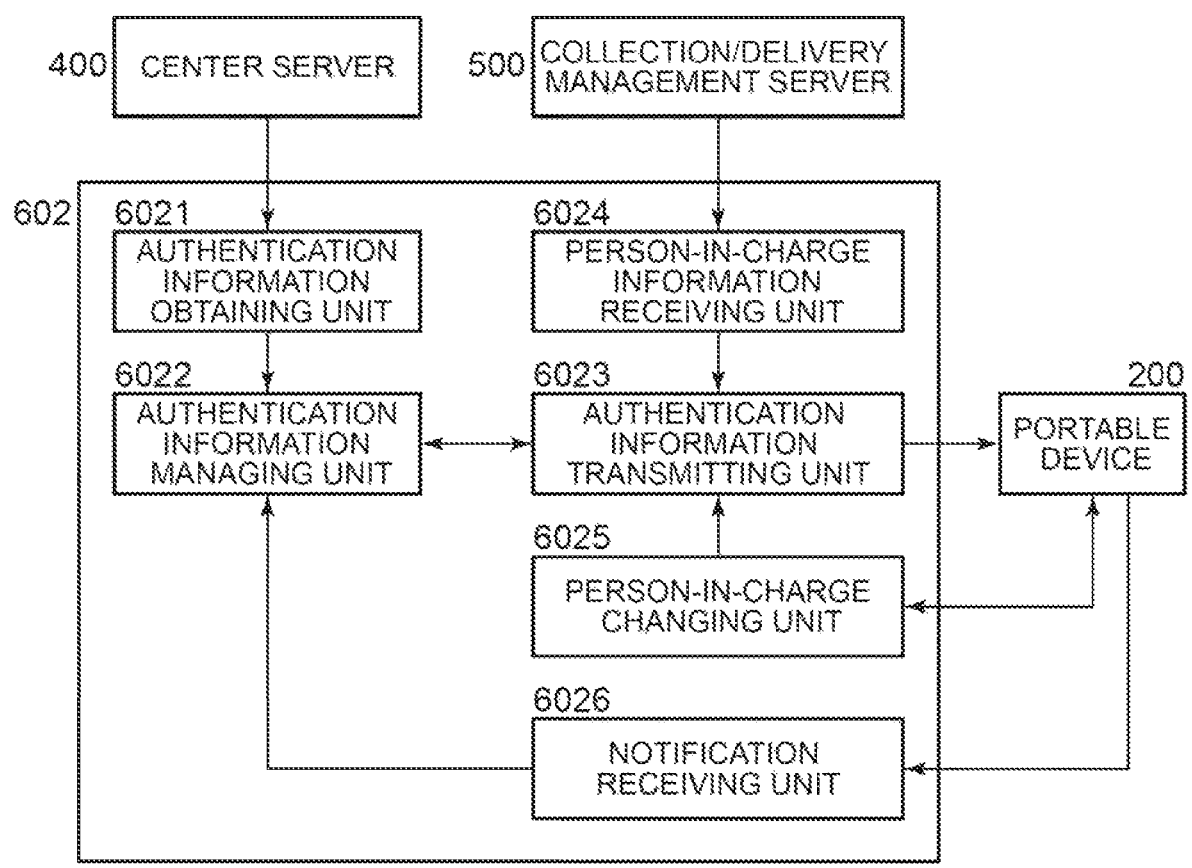
FIG. 6 is a functional block diagram provided by a controller of a relay device.

FIG. 6 shows one example of functions provided by a controller 602 of the relay device 600. The controller 602 has functional units including an authentication information obtaining unit 6021, authentication information managing unit 6022, authentication information transmitting unit 6023, person-in-charge information receiving unit 6024, person-in-charge information changing unit 6025, and notification receiving unit 6026. The processor loads programs stored in the auxiliary storage device into a work area of the main storage device, and executes the programs, so as to implement these functional units. A part or the whole of the functional units may be replaced with a circuit, such as an application specific integrated circuit (ASIC), and a field programmable gate array (FPGA).

The authentication information obtaining unit 6021 is an obtaining unit having a function of obtaining authentication information (enablement data) of the vehicle 10 in question from the center server 400. The authentication information managing unit 6022 is a managing unit having a temporarily storing unit having a function of temporarily storing the authentication information obtained by the authentication information obtaining unit 6021, in a storage device (main storage unit or auxiliary storage unit), a deleting unit having a function of deleting the authentication information stored in the storage device, and an inhibiting unit having a function of inhibiting the authentication information from being transmitted to another portable device in certain cases, so that the authentication information is not provided to two or more portable devices at the same time. The authentication information transmitting unit 6023 is a transmitting unit having a function of sending the enablement data, to the portable device 200 used by the person in charge of collection/delivery work. The person-in-charge information receiving unit 6024 has a function of receiving person-in-charge information for identifying the person in charge of collection/delivery work, from the collection/delivery management server 500. The person-in-charge changing unit 6025 has a function of performing a process of changing the person in charge of collection/delivery work. The notification receiving unit 6026 has a function of receiving, from the portable device 200, a notification indicating that the person in charge has started the operation of the vehicle 10 (for example, unlocking of the trunk room), or a notification that the person in charge has finished operation (for example, locking of the trunk room). Details of these functions will be described later Referring to FIG. 7, operation of the trunk share system 1 will be described.

In step S700, the portable device 50 of the requesting user 1 sends a request for use of collection or delivery service, to the collection/delivery management server 500. At this time, collection/delivery information is transmitted, along with the request for use. The collection/delivery information includes identification information of the requesting user 1, delivery or collection schedule information, and so forth. The collection/delivery management server 500 registers the collection/delivery information in the collection/delivery management DB 503, according to the received request for use.

In step S701, the collection/delivery management server 500 sends a request to obtain authentication information, to the relay device 600. The request includes the identification information of the requesting user 1, delivery or collection schedule information, and so forth. By referring to these items of information, it is possible to determine when the collection or delivery is conducted and which vehicle on which the collection or delivery is performed, namely, it is possible to specify authentication information to be transmitted and a transmission schedule. However, at this point in time, a person actually in charge of collection or delivery has not been determined; therefore, the authentication information cannot be directly sent to the portable device 200 of the collecting/delivering user S.

In step S702, the authentication information obtaining unit 6021 of the relay device 600 sends a request for authentication information, to the center server 400. The request for authentication information includes the identification information of the requesting user 1, delivery or collection schedule information, etc. In step S703, the center server 400 reads the authentication information of the requesting user 1 from the user information DB 403, and sends the information to the relay device 600. At this time, the center server 400 may set a valid period to the authentication information, and may determine the timing of transmission of the authentication information, based on the delivery or collection schedule information. When receiving the authentication information from the center server 400, the authentication information managing unit 6022 of the relay device 600 stores the authentication information in the storage device (step S704).

Then, when a person in charge of collection/delivery work is appointed, and this information is registered in the collection/delivery management DB 503 of the collection/ delivery management server 500, the collection/delivery management server 500 sends person-in-charge information to the relay device 600 (step S705). The person-in-charge information includes the ID of the collecting/delivering user S in charge of collection/delivery work, information specifying the portable device 200 used by the collecting/delivering user S (namely, information specifying the destination of transmission of the authentication information), and so forth. When the person-in-charge information receiving unit 6024 of the relay device 600 receives the person-in-charge information from the collection/delivery management server 500, it passes the person-in-charge information to the authentication information transmitting unit 6023. In step S706, the authentication information transmitting unit 6023 receives the authentication information stored in the storage device, via the authentication information managing unit 6022, and sends the authentication information to the portable device 200 of the collecting/delivering user S. Once transmission of the authentication information is completed, the authentication information managing unit 6022 switches the relay device 600 to an inhibited state (inhibition mode) in which transmission of the authentication information is inhibited, so that the same authentication information will not be transmitted to other portable devices at the same time (step S707).

When the portable device 2M receives authentication information from the relay device 600, it stores the authentication information in a memory. When the collecting/delivering user S approaches the vehicle 10 while carrying the portable device 200 in which the authentication information for the vehicle 10 is stored, and enters a range (for example, an area having a radius of two to three meters) within which the portable device 200 can communicate with the key unit 100, communications between the portable device 200 and the key unit 100 are established, and the authentication information is transmitted from the portable device 200 to the key unit 100 (step S708). The key unit 100 determines whether the received authentication information is valid, and notifies the portable device 200 of the success of authentication if it is valid authentication information (step S709). At the same time, the key unit 100 starts operating as a smart key.

Then, if the collecting/delivering user S sends an unlocking signal, using a locking/unlocking application of the portable device 20, or take a locking/unlocking action, for example, presses an unlocking button of the vehicle 10 itself, the door of the trunk room of the vehicle 10 is unlocked, and the user S can access the trunk room (step S710). When the vehicle 10 is unlocked, a start notification indicating that the operation of the vehicle 10 has started is sent from the key unit 100 to the portable device 200 (step S711).

If the collecting/delivering user S sends a locking signal, using the locking/unlocking application of the portable device 200, or takes a locking action, for example, presses a locking button of the vehicle 10 itself, after doing collection (pick-up of a package placed in the trunk room) or delivery (placement of a package in the trunk room), the door of the vehicle 10 is locked (step S712). When the vehicle 10 is locked, an ending notification indicating that the operation of the vehicle 10 has ended is transmitted from the key unit 100 to the portable device 200 (step S713).

The portable device 200 deletes the authentication information stored in the memory, using receipt of the ending notification from the key unit 100 as a trigger (step S714), and sends the ending notification to the relay device 600 (step S715). The relay device 600 deletes the authentication information stored in the storage device, using receipt of the ending notification from the portable device 200 as a trigger (step S716).

The system of this embodiment as described above has the following advantages. Since the relay device 600 performs operation to transmit authentication information to the portable device 200, and operation to exclude others from access to the authentication information, the load of the center server 400 can be reduced. In particular, the center server 400 is only required to perform secure processing with the relay device 600; therefore, the load of the center server 400 can be significantly reduced, as compared with the case where secure processing is performed between the center server 400 and all of the users. Also, since the relay device 600 sends the authentication information to the portable device 200, and deletes the authentication information temporarily stored in the storage device, it is guaranteed that the authentication information is transmitted solely to the person who is scheduled to actually use the authentication information, and a risk of leakage of the authentication information, for example, can be reduced.

When the relay device 600 sends a request for authentication information, to the center server 400, it gives information indicating the scheduled date and time when the vehicle 10 is to be operated, to the center server 400, thus permitting the center server 400 to set a valid period for the authentication information, and adjust the time of transmission of the authentication information in accordance with the scheduled date and time. With the valid period and appropriate transmission time thus set, risks of leakage and improper use of the authentication information can be expected to be reduced.

Since the relay device 600 sends the authentication information to the portable device 200 of the person in charge, using its receipt of the person-in-charge information as a trigger, the authentication information can be automatically provided to the person in charge at an appropriate time. Also, since the authentication information in the memory of the portable device 200 is automatically deleted, using receipt of the ending notification indicating that the operation of the vehicle 10 has ended as a trigger, the risks of leakage and improper use of the authentication information can be reduced. In this connection, receipt of the start notification indicating that the operation of the vehicle 10 has started, rather than the ending notification, may be used as a trigger.

The relay device 600 performs inhibition control for inhibiting the authentication information remaining in the storage device from being transmitted to other portable devices, until the authentication information is deleted, after transmission of the authentication information to the portable device 200 is completed. Accordingly, the risks of leakage and improper use of the authentication information can be reduced.

As a second embodiment, operation of the system in the case where a person in charge of collection/delivery work is changed, after completion of transmission of authentication information to a portable device, will be described. The chart of FIG. 8 shows operation of the system according to the second embodiment. The same reference numerals as used in FIG. 7 are assigned to the same steps as those of the first embodiment. Also, steps that precede step S704, and steps that follow step S710 may be identical with those of the first embodiment (FIG. 7), and therefore, will not be illustrated in the drawings.

In the example of FIG. 8, when person-in-charge information of a collecting/delivering user A is sent from the collection/delivery management server 50 to the relay device 600 (step S705), the authentication information is transmitted to a portable device 200A of the collecting/delivering user A (step S706), and the relay device 600 is switched into the inhibition mode (step S707).

Then, if information to the effect that the person in charge is changed from the collecting/delivering user A to a collecting/delivering user B is sent from the collection/delivery management server 500 to the relay device 600 (step S800), the relay device 600 initially sends a request for deletion of the authentication information, to the portable device 200A of the collecting/delivering user A before the change (step S801). When the portable device 200A deletes the authentication information in the memory, in response to the deletion request (step S802) a notification indicating completion of the deleting operation is sent to the relay device 600 (step S803).

When it is found that the authentication information stored in the portable device 200A has been deleted, the relay device 600 once cancels the inhibition mode (step S804). Then, the relay device 6X) sends authentication information to a portable device 200B of a collecting/delivering user B as a person in charge to which the user A has been changed (step S805), and is switched to the inhibition mode (step S806). As a result, the collecting/delivering user B is able to operate the vehicle 10, using the portable device 200B.

According to the operation as described above, when a change of the person in charge takes place, the authentication information can be promptly sent to the portable device of the person in charge after the change. Also, no authentication information is sent to the portable device of the person in charge after the change, until the authentication information is deleted from the portable device of the person in charge before the change; therefore, the uniqueness of the authentication information can be guaranteed. Accordingly, risks of leakage and improper use of the authentication information can be reduced.

The first and second embodiments are merely provided for describing some specific examples of the disclosure for illustrative purposes only. This disclosure is not limited to the first and second embodiments, but the embodiments may be modified in various forms, within the range of the technical concept of the disclosure.

In the first and second embodiments, the relay device 600 adopts a procedure in which the relay device 600 deletes the authentication information remaining in the storage device, after confirming, from the start notification or ending notification, that the operation of the vehicle has been performed. This procedure has an advantage that the system can promptly deal with change of the person in charge, as in the second embodiment. However, the timing of deletion of the authentication information stored in the relay device 600 is not limited to that of the above embodiments, but, as a third embodiment of the disclosure, the authentication information in the storage device may be deleted, immediately after the relay device 600 sends the authentication information to the portable device 200 of the person in charge (step S900), as shown in FIG. 9 by way of example, With the authentication information thus deleted in this timing, it is possible to prevent the authentication information from being transmitted to two or more portable devices, and the uniqueness of the authentication information can be guaranteed. Also, the period for which the authentication information is temporarily stored in the storage device can be minimized, and therefore, the risk of leakage of the authentication information can be reduced to a minimum.

While this disclosure is applied to the trunk share system in the first to third embodiments, the disclosure is not limited to this application, but may be favorably applied to various systems and services. Namely, the disclosure may be applied to any system or service (such as car sharing, and replacement driver service), provided that the system or service utilizes a mechanism that permits a person other than the owner of the vehicle to operate the vehicle, by providing the person with enablement data.

While the key unit that behaves like a smart key is illustrated in the first to third embodiments, the range of application of the disclosure is not limited to this. For example, a locking/unlocking control device and a portable device, which are connected to a control system of a vehicle, may be configured to directly conduct wireless communications. Also, a device on the vehicle side and a portable device may communicate with each other via the Internet, rather than directly communicating via short-range wireless communications.

What is claimed is:

1. A relay device for use in a system that enables a person who possesses a portable device in which enablement data as data that permits operation of a vehicle is stored, to operate the vehicle, the relay device being configured to relay the enablement data from a center server that issues the enablement data of the vehicle, to a portable device of a person who is scheduled to operate the vehicle, the relay device comprising:
a processor coupled to a memory and configured to:
obtain the enablement data of the vehicle from the center server;
temporarily store the enablement data obtained, in a storage device;
send the enablement data stored in the storage device, to a portable device used by a person in charge of operation of the vehicle;
receive notification indicating that the person in charge has started the operation of the vehicle or the person in charge has finished the operation of the vehicle, from the portable device used by the person in charge;
delete the enablement data stored in the storage device in response to receipt of the notification; and
inhibit enablement data remaining in the storage device from being sent to another portable device, until the enablement data is deleted after sending of the enablement data to the portable device used by the person in charge is completed.

2. The relay device according to claim 1, wherein the enablement data comprises at least one of data for proving that the person who possesses the portable device is a person permitted to operate the vehicle, data for activating a device or a program used for the operation of the vehicle, and the program used for the operation of the vehicle.

3. The relay device according to claim 1, wherein the processor is further configured to:
obtain the enablement data of the vehicle from the center server, when the vehicle is scheduled to be operated, but it has not been determined who is in charge of the operation of the vehicle; and
send the enablement data stored in the storage device, to the portable device used by the person in charge of the operation of the vehicle, after the person in charge of the operation of the vehicle is determined.

4. The relay device according to claim 1, wherein the processor is configured to send a request including at least information indicating a scheduled date and time at which the vehicle is scheduled to be operated, to the center server, to be supplied with the enablement data corresponding to the request, from the center server.

5. The relay device according to claim 1, wherein the processor is further configured to receive person-in-charge information for identifying the person in charge of the operation of the vehicle, and
send the enablement data to the portable device used by the person identified by the person-in-charge information, when the processor receives the person-in-charge information.

6. The relay device according to claim 1, wherein the processor is further configured to perform a process of changing the person in charge of the operation of the vehicle, wherein:
when the person in charge of the operation of the vehicle is changed from a first person in charge to a second person in charge, after sending of the enablement data to the portable device used by the first person in charge is completed,
the processor is configured to perform deleting operation to delete the enablement data stored in the portable device used by the first person in charge, and to send the enablement data to a portable device used by the second person in charge, after the deleting operation is completed.

7. The relay device according to claim 1, wherein:
the vehicle includes a vehicle-mounted device used for the operation of the vehicle;
the enablement data comprises authentication information used by the vehicle-mounted unit for authentication of the portable device; and
the vehicle is permitted to be operated using the vehicle-mounted device, when the portable device is successfully authenticated by the enablement data stored in the portable device.

8. The relay device according to claim 7, wherein:
when the person in charge of the operation of the vehicle is changed from a first person in charge to a second person in charge, after sending of the enablement data to the portable device used by the first person in charge is completed,
the processor is configured to cancel an inhibition mode in which sending of the enablement data is inhibited; and
send the enablement data to a portable device used by the second person in charge.

9. The relay device according to claim 7, wherein the vehicle-mounted device is configured to perform authentication of the portable device via short-range wireless communication.

10. The relay device according to claim 7, wherein the vehicle-mounted device is configured to behave in the same manner as a smart key of the vehicle, when the portable device is successfully authenticated.

11. A method for a relay device, the relay device being for use in a system that enables a person who possesses a portable device in which enablement data as data that permits operation of a vehicle is stored, to operate the vehicle, the relay device being configured to relay the enablement data from a center server that issues the enablement data of the vehicle, to a portable device of a person who is scheduled to operate the vehicle, the method comprising:
obtaining, with a processor of the relay device, the enablement data of the vehicle from the center server;
temporarily storing, with the processor of the relay device the enablement data obtained, in a storage device;
sending, with the processor of the relay device, the enablement data stored in the storage device, to a portable device used by a person in charge of operation of the vehicle;
receiving, with the processor of the relay device, notification indicating that the person in charge has started the operation of the vehicle or the person in charge has finished the operation of the vehicle, from the portable device used by the person in charge;
deleting, with the processor of the relay device, the enablement data stored in the storage device in response to receipt of the notification; and
inhibiting enablement data remaining in the storage device from being sent to another portable device, until the enablement data is deleted after sending of the enablement data to the portable device used by the person in charge is completed.

12. The method according to claim 11, wherein the enablement data comprises at least one of data for proving that the person who possesses the portable device is a person permitted to operate the vehicle, data for activating a device or a program used for the operation of the vehicle, and the program used for the operation of the vehicle.

13. The method according to claim 11, further comprising:
obtaining the enablement data of the vehicle from the center server, when the vehicle is scheduled to be operated, but it has not been determined who is in charge of the operation of the vehicle; and
sending the enablement data stored in the storage device, to the portable device used by the person in charge of the operation of the vehicle, after the person in charge of the operation of the vehicle is determined.

14. The method according to claim 11, further comprising sending a request including at least information indicating a scheduled date and time at which the vehicle is scheduled to be operated, to the center server, to be supplied with the enablement data corresponding to the request, from the center server.

15. The method according to claim 11, further comprising:
receiving person-in-charge information for identifying the person in charge of the operation of the vehicle, and
sending the enablement data to the portable device used by the person identified by the person-in-charge information, when the processor receives the person-in-charge information.

16. The method according to claim 11, further comprising:
when the person in charge of the operation of the vehicle is changed from a first person in charge to a second person in charge, after sending of the enablement data to the portable device used by the first person in charge is completed,
canceling an inhibition mode in which sending of the enablement data is inhibited; and
sending the enablement data to a portable device used by the second person in charge.

17. The method according to claim 11, further comprising performing a process of changing the person in charge of the operation of the vehicle, wherein:
when the person in charge of the operation of the vehicle is changed from a first person in charge to a second person in charge, after sending of the enablement data to the portable device used by the first person in charge is completed, the method includes performing deleting operation to delete the enablement data stored in the portable device used by the first person in charge, and sending the enablement data to a portable device used by the second person in charge, after the deleting operation is completed.

18. A non-transitory computer-readable medium encoded with computer-readable instructions that are executed by a processor of a relay device that is used in a system that enables a person who possesses a portable device in which enablement data as data that permits operation of a vehicle is stored, to operate the vehicle, the relay device being configured to relay the enablement data from a center server that issues the enablement data of the vehicle, to a portable device of a person who is scheduled to operate the vehicle, when the processor executes the computer-readable instructions the processor performs a method the method comprising:

obtaining the enablement data of the vehicle from the center server;

temporarily storing the enablement data obtained, in a storage device;

sending the enablement data stored in the storage device, to a portable device used by a person in charge of operation of the vehicle;

receiving notification indicating that the person in charge has started the operation of the vehicle or the person in charge has finished the operation of the vehicle, from the portable device used by the person in charge;

deleting the enablement data stored in the storage device in response to receipt of the notification; and performing a process of changing the person in charge of the operation of the vehicle, wherein:

when the person in charge of the operation of the vehicle is changed from a first person in charge to a second person in charge, after sending of the enablement data to the portable device used by the first person in charge is completed, the method includes performing deleting operation to delete the enablement data stored in the portable device used by the first person in charge, and sending the enablement data to a portable device used by the second person in charge, after the deleting operation is completed.

\* \* \* \* \*